United States Patent
Park et al.

(10) Patent No.: US 12,301,049 B2
(45) Date of Patent: May 13, 2025

(54) DUAL POWER SUPPLY APPARATUS FOR AUTONOMOUS VEHICLE AND METHOD THEREOF

(71) Applicants: Hyundai Motor Company, Seoul (KR); Kia Corporation, Seoul (KR); Kyungshin Corp., Incheon (KR)

(72) Inventors: Seong Cheol Park, Gyeonggi-do (KR); Soon Myung Kwon, Gyeonggi-do (KR); Jong Joo Kim, Gyeonggi-do (KR); Tae Hwan Park, Seoul (KR); Dong Hyun Park, Incheon (KR)

(73) Assignees: Hyundai Motor Company, Seoul (KR); Kia Corporation, Seoul (KR); Kyungshin Corp., Incheon (KR)

( * ) Notice: Subject to any disclaimer, the term of this patent is extended or adjusted under 35 U.S.C. 154(b) by 127 days.

(21) Appl. No.: 17/735,751

(22) Filed: May 3, 2022

(65) Prior Publication Data
US 2023/0027181 A1    Jan. 26, 2023

(30) Foreign Application Priority Data
Jul. 13, 2021  (KR) .................. 10-2021-0091792

(51) Int. Cl.
| | |
|---|---|
| B60L 1/14 | (2006.01) |
| B60L 3/00 | (2019.01) |
| B60L 58/18 | (2019.01) |
| H02J 3/00 | (2006.01) |
| H02J 7/00 | (2006.01) |
| H02J 9/06 | (2006.01) |

(52) U.S. Cl.
CPC ............... *H02J 9/062* (2013.01); *B60L 1/14* (2013.01); *B60L 3/0046* (2013.01); *B60L 3/0069* (2013.01); *B60L 58/18* (2019.02); *H02J 3/0012* (2020.01); *H02J 7/0013* (2013.01); *H02J 7/00304* (2020.01); *B60L 2240/54* (2013.01); *H02J 2207/20* (2020.01)

(58) Field of Classification Search
CPC .......... B60L 58/18; B60L 1/14; B60L 3/0046
USPC ........................................................ 307/142
See application file for complete search history.

(56) References Cited

U.S. PATENT DOCUMENTS

| | | | |
|---|---|---|---|
| 6,465,909 B1 * | 10/2002 | Soo ........................ | H02J 1/001 |
| | | | 307/53 |
| 7,235,898 B1 | 6/2007 | Jones et al. | |
| 9,457,684 B2 | 10/2016 | Crombez et al. | |
| 10,293,767 B2 | 5/2019 | Lee et al. | |
| 10,723,228 B2 | 7/2020 | Nakayama et al. | |
| 2017/0079094 A1 * | 3/2017 | Okita ................... | H02H 11/003 |
| 2017/0349048 A1 | 12/2017 | Nakayama et al. | |
| 2020/0001720 A1 * | 1/2020 | Pighi ...................... | B60L 50/10 |

FOREIGN PATENT DOCUMENTS

| | | |
|---|---|---|
| JP | 2017-218013 A | 12/2017 |
| KR | 102192893 B1 | 12/2020 |
| KR | 102242061 B1 | 4/2021 |

* cited by examiner

*Primary Examiner* — Daniel Cavallari
*Assistant Examiner* — Dru M Parries
(74) *Attorney, Agent, or Firm* — Fox Rothschild LLP

(57) ABSTRACT

A dual power supply apparatus includes a main power grid that supplies power by a first battery to an autonomous vehicle and a redundant power grid that supplies power to a dual power load based on a second battery, in an emergency driving mode due to a failure in the main power grid.

15 Claims, 7 Drawing Sheets

DUAL POWER SUPPLY APPARATUS FOR AUTONOMOUS VEHICLE AND METHOD THEREOF

CROSS-REFERENCE TO RELATED APPLICATION

This application claims under 35 U.S.C. § 119(a) the benefit of Korean Patent Application No. 10-2021-0091792, filed in the Korean Intellectual Property Office on Jul. 13, 2021, the entire contents of which are incorporated herein by reference.

BACKGROUND

(a) Technical Field

The present disclosure relates to a dual power supply apparatus for an autonomous vehicle and a method thereof, more particularly, relates to technologies of selectively supplying power to a dual power load of the autonomous vehicle.

(b) Description of the Related Art

Recently in the automotive industry, autonomous vehicles have been developed, in particular, for the convenience of drivers. However, an autonomous vehicle needs a separate redundant power grid capable of independently supplying power in emergency situations.

Furthermore, the autonomous vehicle should be able to perform a minimum risk maneuver (MRM) in an emergency situation. To this end, the autonomous vehicle needs to have a dual power configuration of power supplied to loads (e.g., headlamps, brake lights, emergency lights, a windshield wiper, a horn, crash unlock, or the like) necessary for safety for an MRM other than a steering system and a braking system.

However, in an existing technology, when a short circuit occurs in one of two power grids while a dual power is applied to a safety load of the autonomous vehicle, current passing may occur therein.

Furthermore, in the existing technology, as a continuous power source is connected to the safety load, because power is continuously applied to headlamps or the like, which do not need to receive a dual power during normal driving, power efficiency is degraded. As a dual power is supplied through a converter and a high current switch (e.g., a powernet safety guard (PSG)) when it is supplied to the safety load, the capacity of the converter and the high current switch should be increased.

SUMMARY

An aspect of the present disclosure provides a dual power supply apparatus for determining when dual power supply is required during autonomous driving and selectively supplying a redundant power to a safety load to minimize capacity or a size of a converter and a high current switch and preventing an internal passing current from being generated when the power grid fails to ensure stability and stably supply power the safety load, when the main power grid fails and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a dual power supply apparatus may include a main power grid that supplies power by a first battery to an autonomous vehicle and a redundant power grid that supplies power to a dual power load based on a second battery, in an emergency driving mode due to a failure in the main power grid.

In an embodiment, the dual power load may include at least one of headlamps, brake lights, emergency lights, a windshield wiper, a horn, or crash unlock.

In an embodiment, the failure in the main power grid may include a short circuit or an abnormality in voltage.

In an embodiment, the redundant power grid may include a high current switching device that separates the main power grid from the redundant power grid when the main power grid or the redundant power grid fails.

In an embodiment, the high current switching device may output a wake-up signal using an output voltage of the main power grid and a redundant voltage by the second battery.

In an embodiment, the redundant power grid may further include a converter that converts a high voltage of the main power grid into a low voltage and delivers the low voltage to the high current switching device.

In an embodiment, the redundant power grid may further include a dual power controller that supplies the power to the dual power load in the emergency driving mode due to the failure in the main power grid depending on a wake-up signal of the high current switching device.

In an embodiment, the high current switching device may include a switching device provided between an output end of the main power grid and an output end of the redundant power grid.

In an embodiment, the high current switching device may further include a controller that determines a failure in the main power grid or the redundant power grid and a gate driver that is controlled by the controller to control to close or open the switching device.

In an embodiment, the gate driver may output a short circuit determination voltage signal when detecting an overcurrent of the main power grid or the redundant power grid.

In an embodiment, the high current switching device may further include a wake-up signal output device that outputs a wake-up signal using the short circuit determination voltage signal of the gate driver and a voltage signal of the redundant power grid.

In an embodiment, the wake-up signal output device may include an inverter that inverts the short circuit determination voltage signal and an AND gate that logically calculates an output signal of the inverter and the voltage signal of the redundant power grid.

In an embodiment, the high current switching device may further include a wake-up signal output device that outputs a wake-up signal using a voltage signal output from the main power grid and a predetermined reference voltage.

In an embodiment, the wake-up signal output device may include a first comparator that compares the voltage signal output from the main power grid with a predetermined first reference voltage and a second comparator that compares the voltage signal output from the main power grid with a predetermined second reference voltage.

In an embodiment, the first comparator may output a high level value, when the voltage signal output from the main power grid is greater than the first reference voltage and the second comparator may output the high level value, when the voltage signal output from the main power grid is less than or equal to the second reference voltage.

According to another aspect of the present disclosure, a dual power supply method may include supplying power of a main power grid to an autonomous vehicle based on a first battery and supplying power of a redundant power grid to a dual power load based on a second battery, in an emergency driving mode due to a failure in the main power grid.

In an embodiment, the supplying of the power to the dual power load may include separating the main power grid from the redundant power grid, when the main power grid or the redundant power grid fails.

In an embodiment, the supplying of the power to the dual power load may include detecting a voltage of the main power grid or an overcurrent of the redundant power grid and outputting a short circuit determination voltage signal.

In an embodiment, the supplying of the power to the dual power load may further include selectively supplying the power to the dual power load using the short circuit determination voltage signal and the voltage signal of the redundant power grid.

In an embodiment, the supplying of the power to the dual power load may include comparing a voltage signal of the main power grid with a predetermined first reference voltage and a predetermined second reference voltage and selectively supply the power to the dual power load, when the voltage signal of the main power grid is greater than the predetermined first reference voltage or is less than or equal to the predetermined second reference voltage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
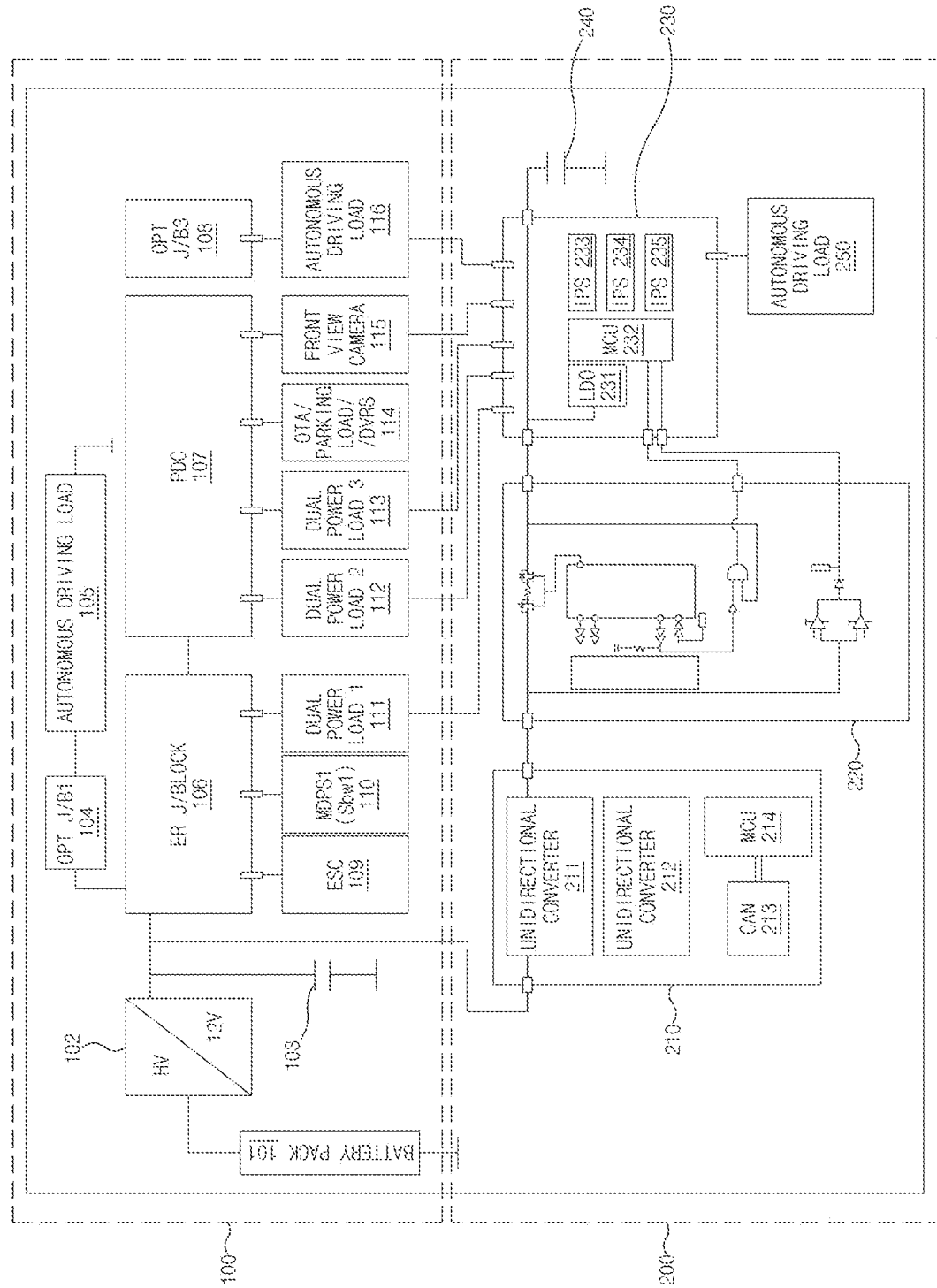
FIG. 1 is a drawing illustrating a configuration of a dual power supply apparatus of a vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a drawing illustrating a configuration of a dual power supply apparatus of a vehicle according to an embodiment of the present disclosure.

A dual power supply apparatus 10 according to an embodiment of the present disclosure may be implemented in a vehicle. In this case, the dual power supply apparatus 10 may be integrally configured with control units in the vehicle or may be implemented as a separate device to be connected with the control units of the vehicle by a separate connection means.

Referring to FIG. 1, the dual power supply apparatus 10 of the vehicle according to an embodiment of the present disclosure may include a main power grid 100 and a redundant power grid 200.

The main power grid 100 may supply power necessary upon the overall operation of the vehicle, for example, driving of the vehicle.

The main power grid 100 may include a battery pack 101, a converter 102, a first battery 103, an option junction block 104, an autonomous driving load 105, an engine room junction block 106, an interior junction block 107, an option junction block 108, an electronic stability control (ESC) 109, a motor driven power steering (MDPS) 110, dual power load 1 111, dual power load 2 112, dual power load 3 113, an over the air (OTA)/parking load/digital video recorder (DVRS) 114, a front view camera 115, and an autonomous driving load 116.

The battery pack 101 may be a high-voltage battery. The converter 102 may convert a high voltage into a low voltage. The first battery 103 may be a low-voltage battery, which may be used for power supply in the main power grid 100. The option junction block 104 may distribute power to the autonomous driving load 105. The engine room junction block 106 may distribute and deliver power to the ESC 109, the MDPS 110, and the dual power load 1 111. To this end, the engine room junction block 106 may be composed of a fuse and a relay.

The interior junction block 107 may distribute and deliver power to the dual power load 2 112, the dual power load 3 113, the OTA/parking load/DVRS 114, the front view camera 115, and the autonomous driving load 116.

In this case, the dual power load 1 111, the dual power load 2 112, or the dual power load 3 113 may include a safety load necessary for safety upon a minimum risk maneuver (MRM) during autonomous driving. For example, the dual power load 1 111, the dual power load 2 112, or the dual power load 3 113 may include headlamps, brake lights, emergency lights, a windshield wiper, a horn, crash unlock, or the like. In an existing technology, because the dual power load 1 111, the dual power load 2 112, and the dual power load 3 113 are connected with a continuous power source in the redundant power grid 200 as well as the main power grid 100, unnecessary power may be consumed. Thus, in an embodiment of the present disclosure, in only an emergency mode due to a failure in the main power grid 100, the redundant power grid 200 may supply power to the dual power load 1 111, the dual power load 2 112, and the dual power load 3 113, thus preventing power efficiency from being degraded due to supply of continuous power. Furthermore, when the dual power load 1 111, the dual power load 2 112, and the dual power load 3 113 are connected with the continuous power source in the redundant power grid 200, the capacity of the converter 210 and the high current switching device 220 should be increased as much as the amount of power supplied to the dual power load 1 111, the dual power load 2 112, and the dual power load 3 113. In an embodiment of the present disclosure, as the dual power load 1 111, the dual power load 2 112, and the dual power load 3 113 are not connected with the continuous power source and as power is selectively supplied to the dual power load 1 111, the dual power load 2 112, and the dual power load 3 113 only if necessary (in only an emergency mode), the capacity of the converter 210 and the high current switching device 220 may be minimized as much as the amount of the power supplied to the dual power load 1 111, the dual power load 2 112, and the dual power load 3 113, thus minimizing cost and area consumption.

The redundant power grid 200 may be configured to independently supply power to correspond to an emergency situation of an autonomous vehicle.

The redundant power grid 200 may include a converter 210, a high current switching device 220, a dual power controller 230, a second battery 240, and an autonomous driving load 250.

The converter 210 may convert a high voltage applied from the main power grid 100 into a low voltage to supply the low voltage to the high current switching device 220. To this end, the converter 210 may include unidirectional converters 211 and 212, a controller area network (CAN) communication device 213, a micro controller unit (MCU) 214, or the like.

When an emergency mode is performed using the redundant power grid 200 due to a failure in the main power grid 100, the high current switching device 220 may output a wake-up signal for waking up the dual power controller 230.

When the emergency mode is performed using the redundant power grid 200 due to the failure in the main power grid 100 and when receiving a high-level wake-up signal from the high current switching device 220, the dual power controller 230 may supply a redundant power by the second battery 240 to the dual power loads 1, 2, and 3 111, 112, and 113.

The dual power controller 230 may include a low-dropout regulator (LDO) 231, a controller 232, and intelligent power switches (IPSs) 233, 234, and 235.

The LDO 231 may play a role in maintaining a low voltage.

When receiving a high-level wave-up signal from the high current switching device 220, the controller 232 may control the IPSs 233, 234, and 235 to supply a redundant power by the second battery 240 to the dual power loads 1, 2, and 3 111, 112, and 113. In this case, the controller 232 may process a signal delivered between the respective components and may perform the overall control such that the respective components may normally perform their own functions. The controller 232 may be implemented in the form of hardware, may be implemented in the form of software, or may be implemented in the form of a combination thereof. Preferably, the controller 232 may be implemented as a microprocessor and may be, for example, an electronic control unit (ECU), a micro controller unit (MCU), or another sub-controller, which is loaded into the vehicle.

The IPSs 233, 234, and 235 may be power supply switches.

The second battery 240 may be a low-voltage battery, which may be used for power supply in the redundant power grid 200. The autonomous driving load 250 may include a load used for autonomous driving.

Figure 2:
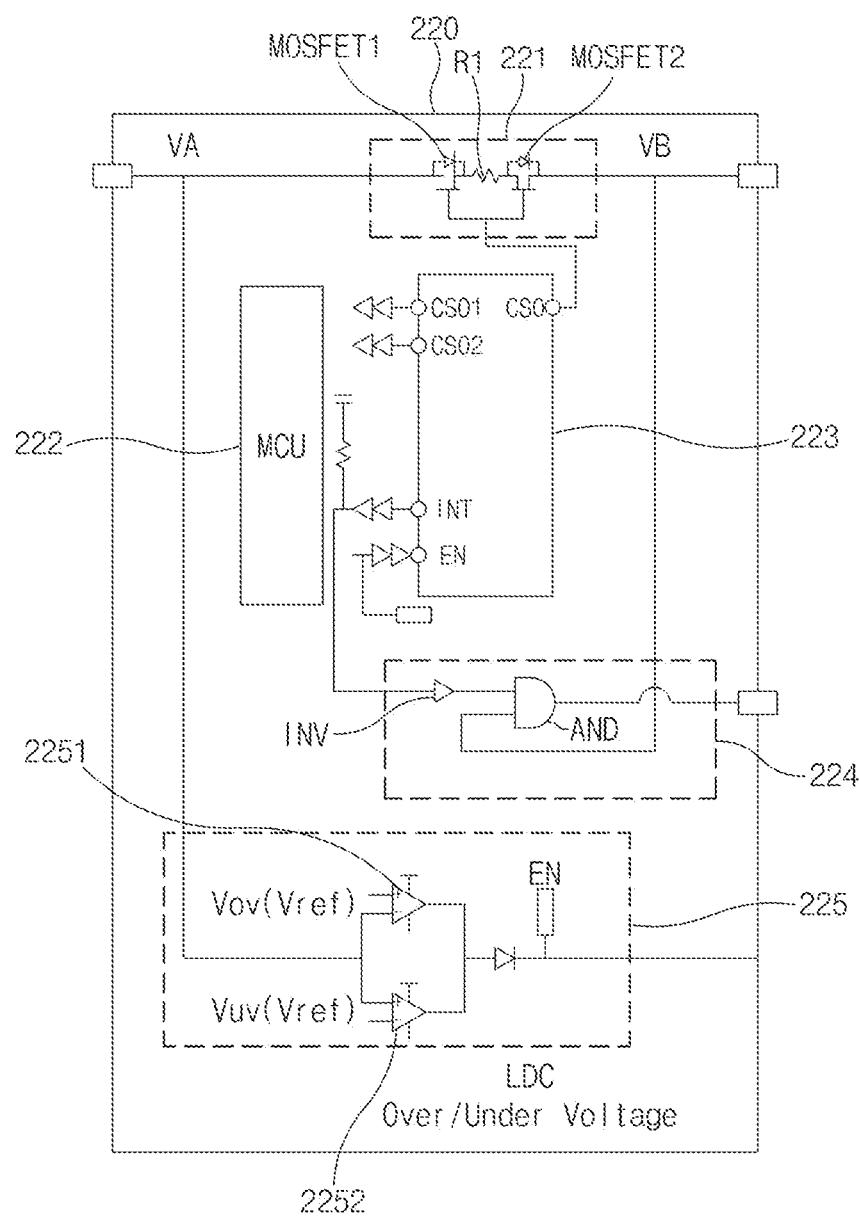
FIG. 2 is a detailed circuit diagram of a high current switching device according to an embodiment of the present disclosure.
Figure 3:
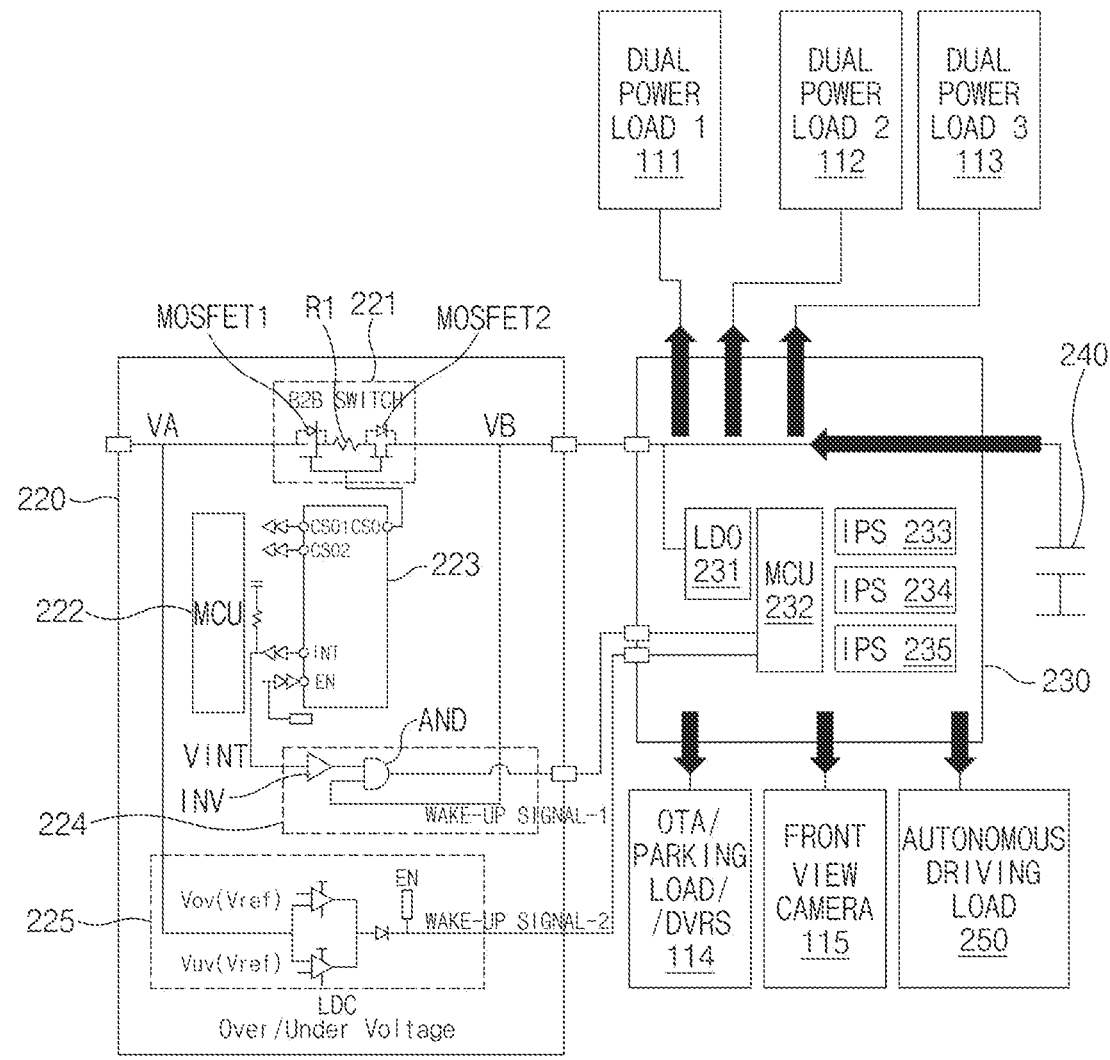
FIG. 3 is a drawing illustrating a method for selectively supplying a dual power according to an embodiment of the present disclosure.

FIG. 2 is a detailed circuit diagram of a high current switching device according to an embodiment of the present disclosure. FIG. 3 is a drawing illustrating a method for selectively supplying a dual power according to an embodiment of the present disclosure.

Referring to FIGS. 2 and 3, a high current switching device 220 may include a switching device 221, a controller 222, a gate driver 223, and wake-up signal output devices 224 and 225.

The switching device 221 may include MOSFETs MOSFET 1 and MOSFET2 and a resistor R1. The resistor R1 may be provided between the MOSFETs MOSFET 1 and MOSFET2. A voltage signal VA loaded onto one side of the switching device 221 may be determined by a first battery 103 of a main power grid 100 of FIG. 1, and a voltage signal VB loaded onto the other may be determined by a second battery 240. In this case, the MOSFETs MOSFET1 and MOSFET2 may be closed and opened at the same time.

The controller 222 may monitor the main power grid 100 to detect a short circuit current and may output a control signal for determining a short circuit determination voltage signal VINT to the gate driver 223. For example, the controller 222 may detect a temperature, an overcurrent, or the like of the main power grid 100 to detect a short circuit current.

The controller 222 may control to close or open the MOSFETs MOSFET1 and MOSFET2 of the switching device 221 depending on a state of the main power grid 100.

In this case, the controller 222 may process a signal delivered between the respective components and may perform the overall control such that the respective components may normally perform their own functions. The controller 222 may be implemented in the form of hardware, may be implemented in the form of software, or may be implemented in the form of a combination thereof. Preferably, the controller 222 may be implemented as a microprocessor and may be, for example, an electronic control unit (ECU), a micro controller unit (MCU), or another sub-controller, which is loaded into the vehicle.

The gate driver 223 may recognize that the switching device 221 is turned on/off (is closed/opened) and may output a voltage VINT which is an input of the wake-up signal output device 224 which outputs wake-up signal 1. The gate driver 223 may be controlled by the controller 222 to output the short circuit determination voltage signal VINT depending on whether the main power grid 100 short-circuits. In other words, when detecting an overcurrent of the main power grid 100 or the redundant power grid 200, the gate driver 223 may output the short circuit determination voltage signal VINT as "0" (being low).

The wake-up signal output device 224 may include an inverter INV and an AND gate AND.

The inverter INV may invert the short circuit determination voltage signal VINT. The AND gate may output a wave-up signal determined by receiving the output voltage of the inverter INV and a voltage signal VB by the second battery 240.

The wake-up signal output device 225 may compare the voltage signal VA by the first battery 103 with a predetermined reference voltage Vref. When the voltage signal VA is identical to the predetermined reference voltage Vref, the wake-up signal output device 225 may output "1". To this end, the wake-up signal output device 225 may include comparators 2251 and 2252. The wake-up s signal output device 225 may detect that a voltage of the main power grid 100 is abnormal and may output a wake-up signal as "1", when the voltage of the main power grid 100 is abnormal. The comparator 2251 may compare the voltage signal VA with a first reference value Vover_Vref (e.g., 16 V). The comparator 2252 may compare the voltage signal VA with a second reference value Vunder_Vref (e.g., 7 V). Thus, when the voltage signal VA is greater than the first reference value Vover_Vref or when the voltage signal VA is less than or equal to the second reference value Vunder_Vref, the wake-up signal output device 225 may determine that an open circuit occurs or a power source is abnormal in the main power grid 100.

Figure 4:
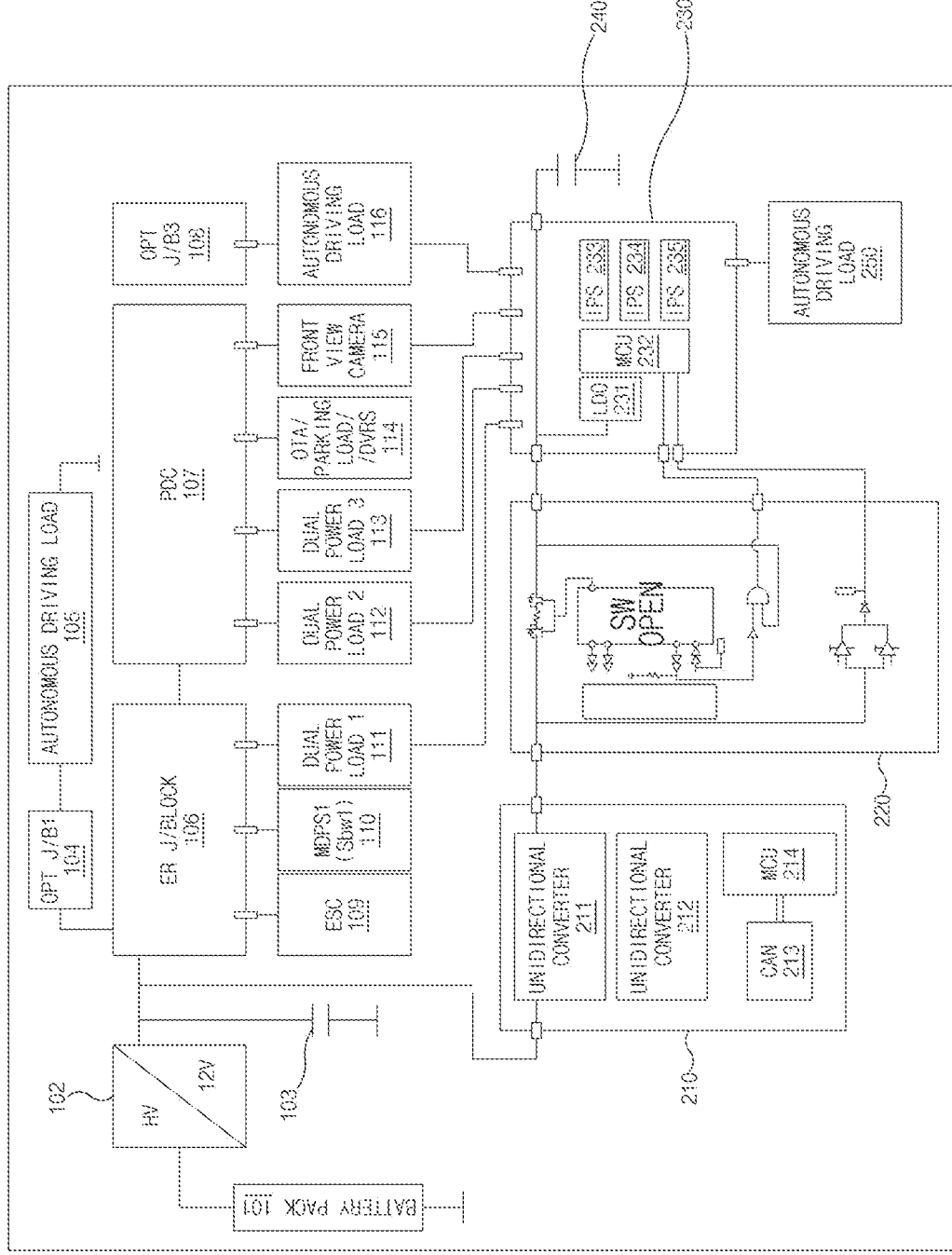
FIG. 4 is a drawing illustrating a dual power control method in a parking state according to an embodiment of the present disclosure.
Figure 5:
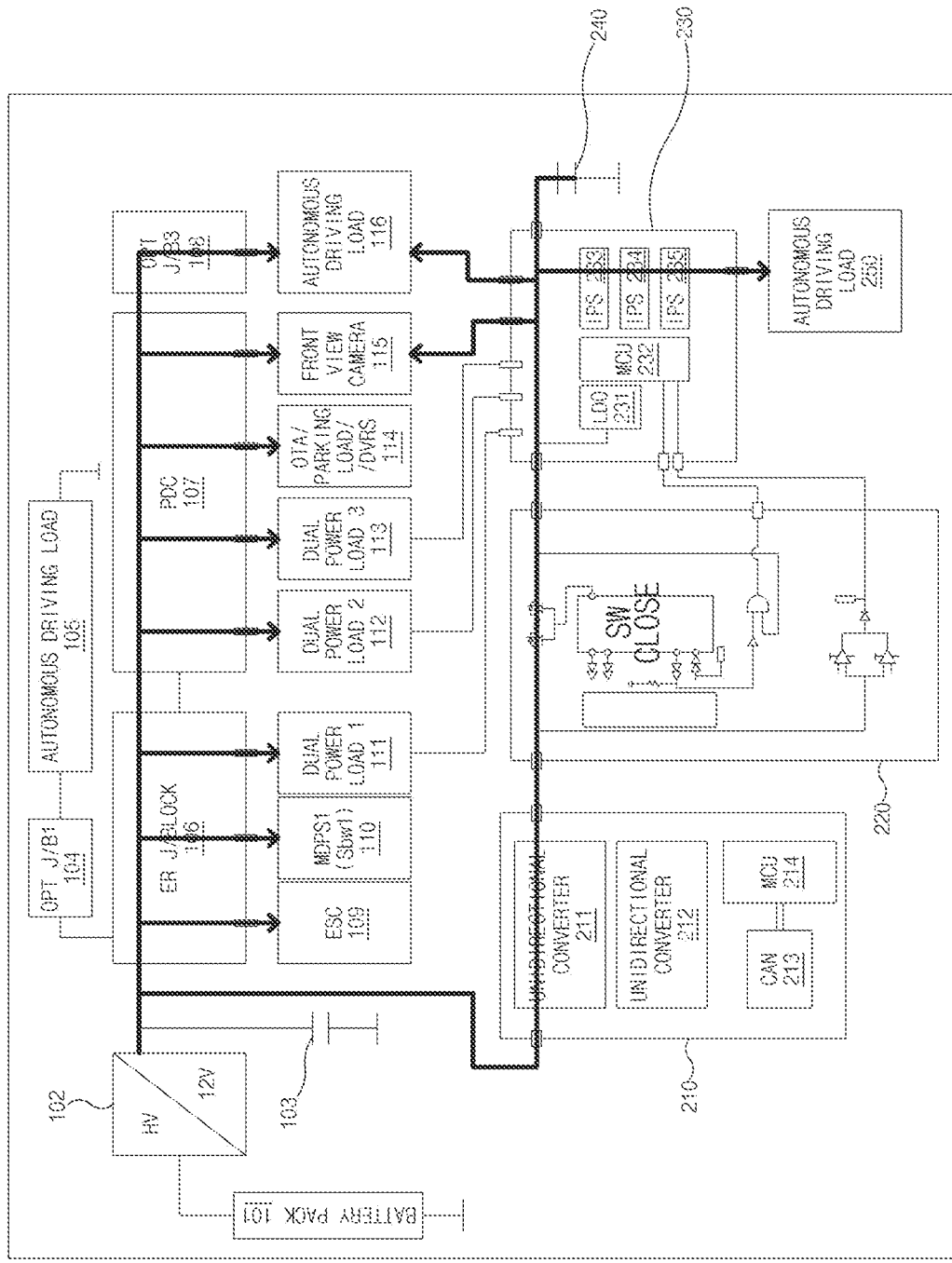
FIG. 5 is a drawing illustrating a dual power control method in a normal driving state according to an embodiment of the present disclosure.
Figure 6:
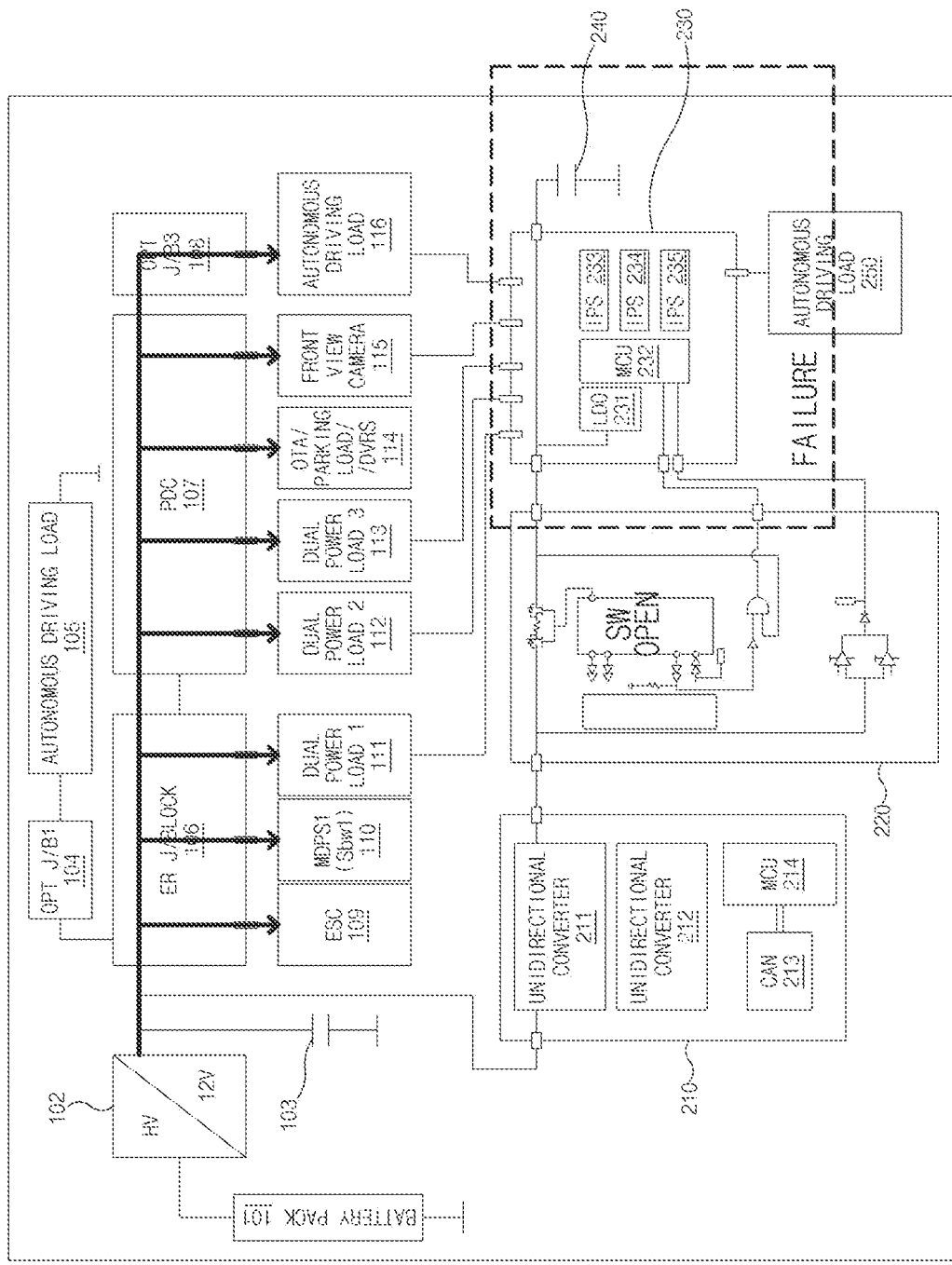
FIG. 6 is a drawing illustrating a dual power control method in an emergency mode, when a redundant power gird fails, according to an embodiment of the present disclosure.
Figure 7:
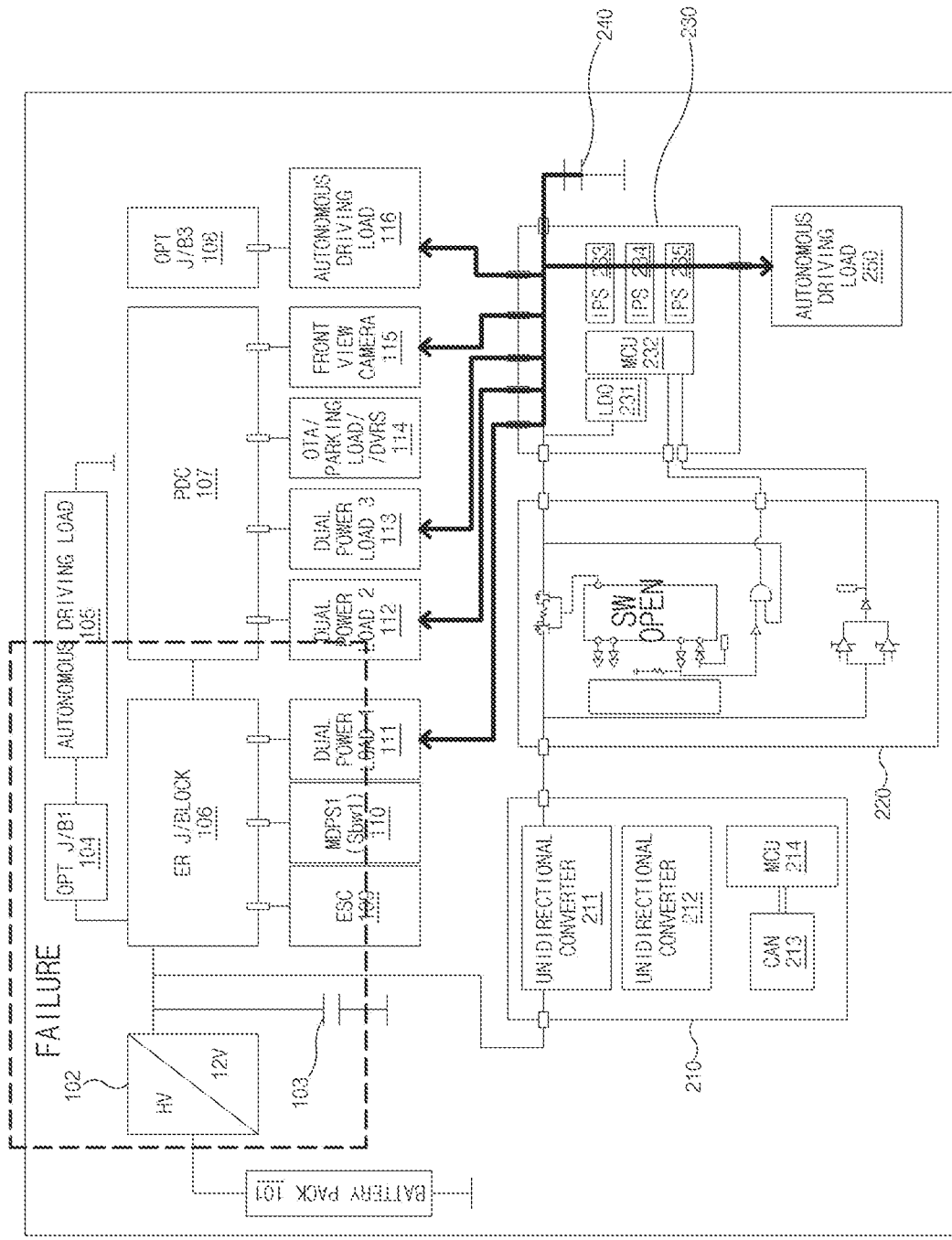
FIG. 7 is a drawing illustrating a dual power control method in an emergency mode, when a main power grid fails, according to an embodiment of the present disclosure.

FIG. 4 is a drawing illustrating a dual power control method in a parking state according to an embodiment of the present disclosure. FIG. 5 is a drawing illustrating a dual power control method in a normal driving state according to an embodiment of the present disclosure. FIG. 6 is a drawing illustrating a dual power control method in an emergency mode, when a redundant power gird fails, according to an embodiment of the present disclosure. FIG. 7 is a drawing illustrating a dual power control method in an emergency mode, when a main power grid fails, according to an embodiment of the present disclosure.

As shown in FIGS. 4 to 7, an autonomous driving mode may be classified as a parking state, normal driving, emergency mode driving by a main power grid, or emergency mode driving by a redundant power grid.

As shown in FIG. 4, in a parking state, a switching device 221 may be opened to minimize a dark current and a dual power controller 230 may be opened.

As shown in FIG. 5, in a normal driving state, the switching device 221 may be closed, power of the main power grid 100 may be supplied to an electronic stability control (ESC) 109, a motor driven power steering (MDPS) 110, dual power load 1 111, dual power load 2 112, dual power load 3 113, an over the air (OTA)/parking load/digital video recorder (DVRS) 114, a front view camera 115, an autonomous driving load 116, or the like, and power of the redundant power grid 200 may be supplied to the OTA/parking load/DVRS 114, the front view camera 115, an autonomous driving load 250, or the like.

As shown in FIG. 6, as the redundant power grid 200 fails, when emergency mode driving is performed using the main power grid 100, a high current switching device 220 may open the switching device 221 to separate the main power grid 100 from the redundant power grid 200.

Furthermore, the power of the main power grid 100 may be supplied to the ESC 109, the MDPS 110, the dual power load 1 111, the dual power load 2 112, the dual power load 3 113, the OTA/parking load/DVRS 114, the front view camera 115, the autonomous driving load 116, or the like, and the power of the redundant power grid 200 may not be supplied.

As shown in FIG. 7, as the main power grid 100 fails, when emergency mode driving is performed using the redundant power grid 200, the high current switching device 220 may open the switching device 221 to separate the main power grid 100 from the redundant power grid 200.

Thus, the redundant power grid 200 rather than the main power grid 100 may supply power to the dual power load 1 111, the dual power load 2 112, the dual power load 3 113, the OTA/parking load/DVRS 114, the front view camera 115, the autonomous driving load 116, or the like.

Hereinafter, a description will be given for each case for selectively supplying power according to an embodiment of the present disclosure with reference to Table. 1 below.

TABLE 1

| Power Grid | Type | PSG B2B SW State | VA | VB | VINT | Wake-up Signal | Case |
|---|---|---|---|---|---|---|---|
| Normal | Driving Mode | CLOSED | 1 | 1 | 1 | 0 | CASE 1 |
| | Idle State | OPEN | 0 | 1 | 1 | 0 | CASE 2 |
| | Parking | OPEN | 0 | 1 | 1 | 0 | CASE 3 |
| | OTA | CLOSED | 1 | 1 | 1 | 0 | CASE 4 |
| | Autonomous Driving | CLOSED | 1 | 1 | 1 | 0 | CASE 5 |
| Failure | Short Circuit of Redundancy Power Grid | OPEN | 0 | 0 | 0 | 0 | CASE 6 |
| | Short Circuit of Main Power Grid | OPEN | 0 | 1 | 0 | 1 | CASE 7 |
| | Abnormality in Voltage of Main Power Grid | OPEN | Greater than or Less than or equal to Reference voltage | — | — | 1 | CASE 8 |

In a normal state mode, a gate driver 223 may output a short circuit determination voltage signal VINT as "1" (a high level). In a normal state, a voltage signal VB of the redundant power grid 200 may become "1". In a driving mode, OTA, or an autonomous driving state, a voltage signal VA of the main power grid 100 may become "1". In an idle state or a parking state, the voltage signal VA of the main power grid 100 may become "0". Thus, as a wake-up signal output by an wake-up signal output device 224 in the normal state is always "0", the power of the redundant power grid 200 may not be supplied to the dual power loads 1, 2, and 3 111, 112, and 113.

Meanwhile, when one of the main power grid 100 or the redundant power grid 200 fails, the gate driver 223 may output the short circuit determination voltage signal VINT as "0" and the switching device 221 of the high current switching device 220 may be opened to separate the main power grid 100 from the redundant power grid 200.

When the redundant power grid 200 short-circuits, an emergency driving mode by the main power grid 100 may be performed and both the voltage signal VA of the main power grid 100 and the voltage signal VB by the redundant power grid 200 may become "0". Thus, the wake-up signal output by the wake-up signal output device 224 may always become "0".

When the main power grid 100 short-circuits, an emergency driving mode by the redundant power grid 200 may be performed, the voltage signal VA of the main power grid 100 may become "1", and the voltage signal VB by the redundant power grid 200 may become "0". Thus, the wake-up signal output by the wake-up signal output device 224 may always become "1".

Meanwhile, when the voltage of the main power grid 100 is less than or equal to or is greater than a predetermined reference voltage Vref, it may be determined that the voltage of the main power grid 100 is abnormal and the wake-up signal by the wake-up signal output device 225 may be output as "1". In this case, the reference voltage may be set in advance by experimental values, which may be, for example, 7 V to 16 V.

As such, an embodiment of the present disclosure may selectively supply power by the redundant power grid to the dual power load to fundamentally block occurrence of an internal passing current, when a power grid fails, thus ensuring stability when the power grid fails.

Furthermore, an embodiment of the present disclosure may not continuously connect the main power grid and the redundant power grid to the dual power load and may selectively supply power only if necessary to maximize power efficiency and may minimize the capacity of the converter 210 and the high current switching device 220 to minimize cost and area consumption.

Furthermore, an embodiment of the present disclosure may stably supply power to the dual power load using the redundant power grid, when the main power grid fails, to ensure stability for a minimum risk maneuver (MRM) during autonomous driving.

The present technology may determines when dual power supply is required during autonomous driving and may selectively supply a redundant power to a safety load to minimize capacity or a size of the converter and the high current switch and may prevent an internal passing current from being generated when the power grid fails to ensure stability and stably supply power the safety load when the main power grid fails.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A dual power supply apparatus for an autonomous vehicle, comprising:
    a main power grid configured to supply power by a first battery to the autonomous vehicle; and
    a redundant power grid configured to supply power to a dual power load based on a second battery, in an emergency driving mode due to a failure in the main power grid, wherein the main power grid is configured to supply power to an autonomous driving load, a parking load, and the dual power load when the vehicle is in a normal driving state,
wherein the redundant power grid is configured to supply power to the autonomous driving load, without supplying power to the dual power load, when the vehicle is in the normal driving state,
wherein the dual power load is supplied with power by only the main power grid in the normal driving state, and is supplied with power by only the redundant power grid in the emergency driving mode,
wherein the redundant power grid includes a high current switching device configured to separate the main power grid from the redundant power grid when the main power grid or the redundant power grid fails,
wherein the high current switching device includes:
  a switching device provided between an output end of the main power grid and an output end of the redundant power grid;
  a controller configured to determine a failure in the main power grid or the redundant power grid;
  a gate driver configured to be controlled by the controller to control to close or open the switching device; and
  a wake-up signal output device configured to output a wake-up signal using a short circuit determination voltage signal of the gate driver and a voltage signal of the redundant power grid, and
wherein the wake-up signal output device includes:
  an inverter configured to invert the short circuit determination voltage signal; and
  an AND gate configured to logically calculate an output signal of the inverter and the voltage signal of the redundant power grid.

2. The dual power supply apparatus of claim 1, wherein the dual power load includes at least one of headlamps, brake lights, emergency lights, a windshield wiper, a horn, or crash unlock.

3. The dual power supply apparatus of claim 1, wherein the failure in the main power grid includes a short circuit or an abnormality in voltage.

4. The dual power supply apparatus of claim 1, wherein the high current switching device outputs a wake-up signal using an output voltage of the main power grid and a redundant voltage by the second battery.

5. The dual power supply apparatus of claim 1, wherein the redundant power grid further includes:
  a converter configured to convert a high voltage of the main power grid into a low voltage and deliver the low voltage to the high current switching device.

6. The dual power supply apparatus of claim 1, wherein the redundant power grid further includes:
  a dual power controller configured to supply the power to the dual power load in the emergency driving mode due to the failure in the main power grid depending on a wake-up signal of the high current switching device.

7. The dual power supply apparatus of claim 1, wherein the gate driver outputs the short circuit determination voltage signal when detecting an overcurrent of the main power grid or the redundant power grid.

8. The dual power supply apparatus of claim 1, wherein the high current switching device further includes:
  a wake-up signal output device configured to output a wake-up signal using a voltage signal output from the main power grid and a predetermined reference voltage.

9. The dual power supply apparatus of claim 8, wherein the wake-up signal output device includes:
  a first comparator configured to compare the voltage signal output from the main power grid with a predetermined first reference voltage; and
  a second comparator configured to compare the voltage signal output from the main power grid with a predetermined second reference voltage.

10. The dual power supply apparatus of claim 9, wherein the first comparator outputs a high level value, when the voltage signal output from the main power grid is greater than the first reference voltage and outputs the high level value, when the voltage signal output from the main power grid is less than or equal to the second reference voltage.

11. A dual power supply method for an autonomous vehicle, comprising:
  supplying power of a main power grid to the autonomous vehicle based on a first battery;
  supplying power of a redundant power grid to a dual power load based on a second battery, in an emergency driving mode due to a failure in the main power grid;
  supplying power of the main power grid to an autonomous driving load, a parking load, and the dual power load when the vehicle is in a normal driving state; and
  supplying power of the redundant power grid to the autonomous driving load, without supplying power to the dual power load, when the vehicle is in the normal driving state,
wherein the dual power load is supplied with power by only the main power grid in the normal driving state, and is supplied with power by only the redundant power grid in the emergency driving mode,
wherein the redundant power grid includes a high current switching device configured to separate the main power grid from the redundant power grid when the main power grid or the redundant power grid fails,
wherein the high current switching device includes:
  a switching device provided between an output end of the main power grid and an output end of the redundant power grid;
  a controller configured to determine a failure in the main power grid or the redundant power grid;
  a gate driver configured to be controlled by the controller to control to close or open the switching device; and
  a wake-up signal output device configured to output a wake-up signal using a short circuit determination voltage signal of the gate driver and a voltage signal of the redundant power grid, and
wherein the wake-up signal output device includes:
  an inverter configured to invert the short circuit determination voltage signal; and
  an AND gate configured to logically calculate an output signal of the inverter and the voltage signal of the redundant power grid.

12. The dual power supply method of claim 11, wherein supplying the power to the dual power load includes:
  separating the main power grid from the redundant power grid, when the main power grid or the redundant power grid fails.

13. The dual power supply method of claim 11, wherein the supplying the power to the dual power load includes:
  detecting a voltage of the main power grid or an overcurrent of the redundant power grid and outputting the short circuit determination voltage signal; and selectively supplying the power to the dual power load using the short circuit determination voltage signal and a voltage signal of the redundant power grid.

14. The dual power supply method of claim 13, wherein supplying the power to the dual power load further includes:
   selectively supplying the power to the dual power load using the short circuit determination voltage signal and the voltage signal of the redundant power grid.

15. The dual power supply method of claim 11, wherein supplying the power to the dual power load includes:
   comparing a voltage signal of the main power grid with a predetermined first reference voltage and a predetermined second reference voltage; and
   selectively supply the power to the dual power load, when the voltage signal of the main power grid is greater than the predetermined first reference voltage or is less than or equal to the predetermined second reference voltage.

* * * * *